Nov. 3, 1931.  J. L. MULHOLLEN  1,830,441
ACCELERATOR CONTROL MECHANISM
Filed July 17, 1929  2 Sheets-Sheet 1

INVENTOR.
J. L. Mulhollen
BY
Elwin M. Hurley
ATTORNEY.

Patented Nov. 3, 1931

1,830,441

UNITED STATES PATENT OFFICE

JAMES L. MULHOLLEN, OF FORT WAYNE, INDIANA

ACCELERATOR CONTROL MECHANISM

Application filed July 17, 1929. Serial No. 378,977.

The invention relates to mechanisms for controlling the operation of accelerators of motor vehicles.

In the operation of motor vehicles, especially in long distance driving, it is tiresome to continuously hold the foot on the commonly used accelerator pedal. Where a steady speed is practicable the operator may relieve his foot by shifting the hand throttle lever at the steering wheel which must be returned by hand in the event a stop is required. Where the foot is maintained on the accelerator pedal it must be moved from that pedal to the brake pedal when stopping of the vehicle is desired and errors are frequently made, especially by new drivers, the accelerator pedal being depressed instead of the brake pedal.

The object of my invention is to provide a mechanism by which the accelerator pedal may be depressed and locked to accomplish a sustained speed, the foot thereafter being removed therefrom and placed on the brake pedal or on the floor conveniently to the brake pedal, the application of the brake or clutch pedals releasing the locking mechanism and the accelerator pedal.

Figure 1:
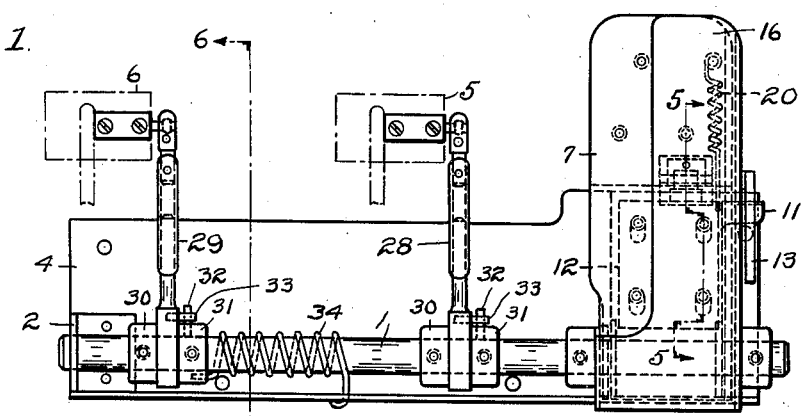
Figure 2:
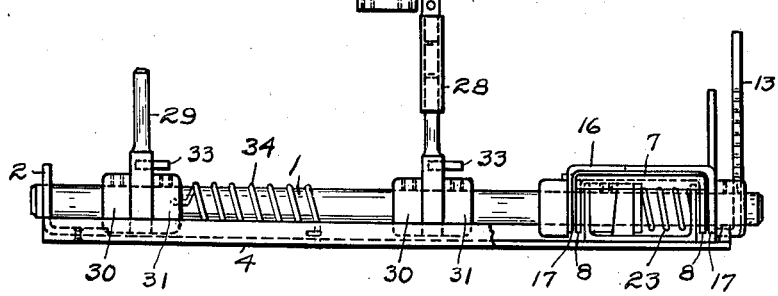
Figure 3:
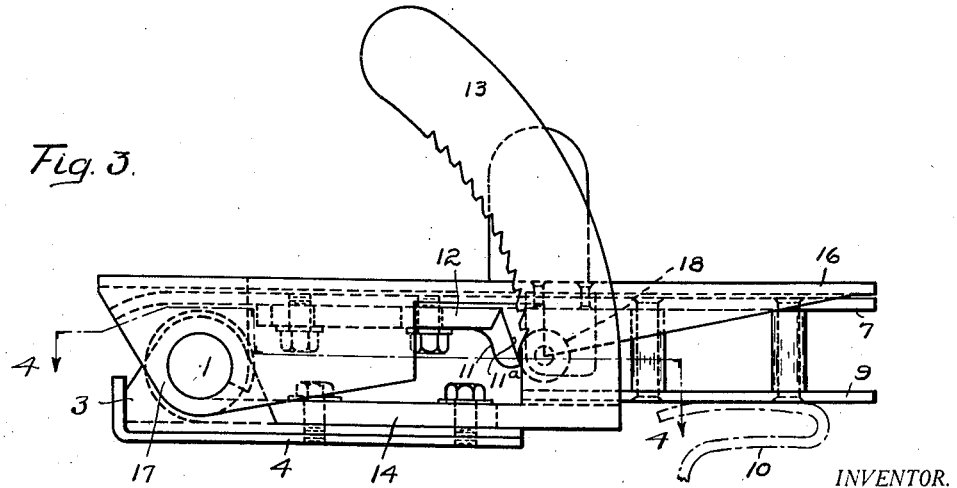
Figure 4:
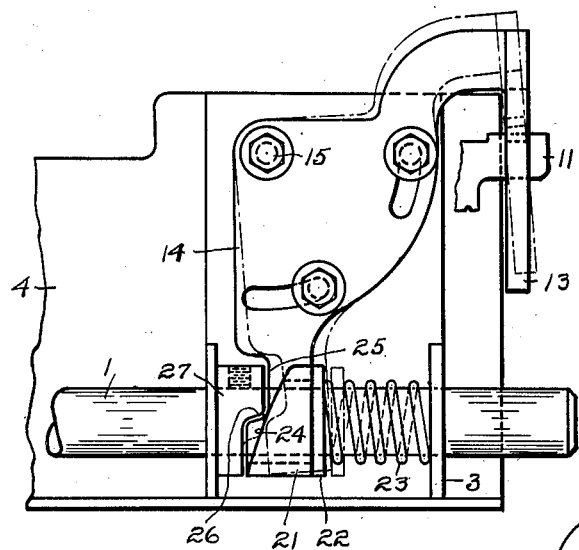
Figure 5:
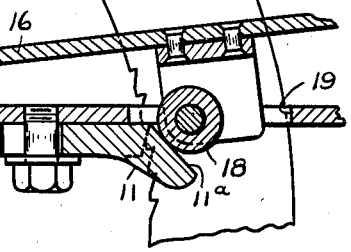
Figure 6:
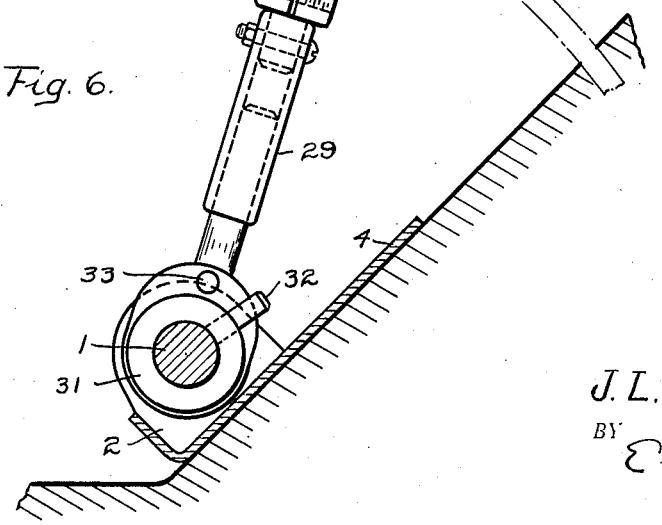

An embodiment of the invention is illustrated in the accompanying drawings in which Figure 1 is a front elevational view of the mechanism; Fig. 2 a plan view of the mechanism, the pedals being turned down; Fig. 3 a side view of the pedals in collapsed condition; Fig. 4 a detail view of the lock releasing mechanism taken on line 4—4 of Fig. 3; Fig. 5 a cross section on line 5—5 of Fig. 1 and Fig. 6 a cross section on line 6—6 of Fig. 1.

Referring to the illustrative embodiment of the invention 1 is a rock shaft suitably mounted in the bearings 2, 3 carried by the base 4 that is attachable to the floor board of a motor vehicle below the usual brake pedal 5 and clutch pedal 6. A pedal 7 is provided with side flanges 8 that are loosely mounted on the shaft 1 and it carries a spaced member or plate 9 on its rear side that is adapted to engage the accelerator pedal 10 of the motor vehicle. A pawl 11 is formed on a plate 12 that is slidably mounted on the rear side of the pedal 7 and is adapted to engage the teeth of an arcuate rack 13 projecting upwardly or forwardly at the side of the pedal 7 from a plate 14 (Fig. 4) that is pivotally mounted at 15 on the base 4.

A second pedal 16 is provided with side flanges 17 that are also loosely mounted on the shaft 1. The pedal 16 overhangs the pedal 7 and for most of its length it is narrower transversely than the pedal 7 so that the foot may contact with either or both of said pedals. When the foot rocks pedal 16 the pedal 7 does not move until pedal 16 contacts with it and rocks it. Pedal 16 carries a roller 18 on its rear side that will pass through an opening 19 formed in the pedal 17 and engage the cam face 11$^a$ of the pawl 11. Normally the roller is disposed in the opening and rests on the cam face 11$^a$ of the pawl which pawl is in engagement with the rack near the forward or upper end thereof. A spring 20 opposes movement of the pawl and therefore holds it in engagement with the rack so that pedal 7 is locked to the rack. Upon depressing the pedal 16 the roller causes the pawl to disengage from the rack and permit the pedal 7 to be rocked on the shaft to depress or release the pedal 10. When the pedal 7 has been rocked to the angle at which it will cause the vehicle through the pedal 10 to be propelled at the selected speed, the pedal 16 is released and the pawl instantly engages with the rack and locks the pedal 7 to the rack in its adjusted position. Upon again depressing the pedal 16 sufficiently to disengage the pawl from the rack the pedal 7 will tend to rock in the opposite direction under the influence of the usual spring (not shown) that opposes the accelerator pedal 10. Hence the speed of the vehicle is readily controlled by depressing or releasing the pedal 7.

The lower end 21 of the plate 14 (Fig. 4) is looped upwardly under the shaft 1, a washer 22 being disposed on the shaft and abutting one edge of the loop 21 and a spring 23 engages the washer and the bearing 3 thereby opposing pivotal movement of the plate 14 and holding the rack against the pawl. The forward portion of the loop is tapered to form a sloping edge 24 opposite the washer 22 and the corresponding edge of the rear portion of the loop is notched at 25 to receive the cam projection 26 of a collar 27 that is secured to the shaft 1. When the collar 27 is rotated in proper direction the cam forces the loop toward the bearing 3 and thereby causes the plate 14 to swing on its pivot and move the rack 13 away from the pawl to release the pedal 7 and the pedal 10.

In order that the movement of the cam collar 27 shall be automatic I loosely mount on the shaft 1 at suitable points two levers 28 and 29 each of which is telescoping in form and I hold each in place by two collars 30 and 31 one of each of which pairs of collars, as 31, carries a pin 32 that is adapted to be abutted by a pin 33 projecting from the levers. The levers are suitably pivotally connected to the brake and clutch pedals 5, 6 respectively. A spring 34 opposes the rotation of the shaft 1.

It is apparent by depressing either pedal 5 or 6 that the pin 33 on the lever 28 or 29 will abut pin 32 and cause the shaft and the cam collar 27 to rotate whereby the plate 14 is rocked on its pivot and the rack is drawn away from the pawl to release the pedal 7, the telescoping property of the lever 28 or 29 accommodating the movement of the pedal.

The pedal 7 may be depressed without depressing the pedal 16 to increase the speed of the vehicle but it will not return to normal position without depressing the pedal 16 to release the pawl or by depressing either pedal 5 or 6 to move the rack away from the pawl. Hence the pedal 7 remains in the position to which it is rocked by the foot of the driver and he may then place his foot on or adjacent to the brake pedal and he can operate the latter pedal and automatically release the pedal 7.

What I claim is:

1. The combination with a motor vehicle accelerator actuating member, a brake pedal and a clutch pedal, of a rock shaft having operating connections with both pedals, a rocking pedal adapted to engage and depress the accelerator actuating member, a movable rack, a pawl carried by the rocking member and adapted to engage the rack, a second rocking member overlying the first rocking member and adapted to release the pawl and to abut the said first rocking member and means secured to the shaft and adapted when either of the brake or clutch pedals is operated to release the rack from the pawl.

2. The combination with a motor vehicle accelerator actuating member, of a rocking pedal adapted to engage and depress the said member, a rack, a pawl carried by the pedal and adapted to engage the rack and a second rocking pedal overlying the first rocking pedal and adapted to release the pawl when rocked toward the first rocking pedal.

3. The combination with a motor vehicle accelerator actuating member, of a pedal pivotally mounted at one end and adapted to engage and depress the said actuating member, a pawl carried by the pedal, a toothed rack adapted to be engaged by the pawl, a second pedal pivotally mounted at one end and overlying the first pedal and a member mounted on the second pedal and adapted to engage the pawl to release the pawl from the rack when the latter pedal is rocked toward the first pedal.

In witness whereof I have hereunto subscribed my name.

JAMES L. MULHOLLEN.